Patented Apr. 3, 1928.

1,664,964

UNITED STATES PATENT OFFICE.

GEORGE BENTLEY BERGEN, SR., OF MILWAUKEE, WISCONSIN.

STONE VENEER.

No Drawing. Application filed December 2, 1925. Serial No. 72,836.

My invention relates to a new and useful process for veneering wood, metal, glass, pottery etc. with a thin coating of artificial stone, beautifully colored and far more durable than paint or varnish.

I am fully aware of the formulæ and processes employed in the production of roofing, flooring and wainscoating, and while using the well-known magnesium oxychloride, or Sorel cement, as a basis, I depart from the common usage in several important particulars. It was while attempting to make tiles in accordance with many of the previously patented processes that I encountered insuperable obstacles to success, and was forced to devise a means to prevent warping, blow holes, cracking and other defects. As my purpose had no relation to building operations but only to the production of a beautiful and resistant veneer for boxes, furniture decoration, both metal and wood, the hardness or strength of the material was of secondary consideration.

In carrying out the invention, I make use of a calcined and powdered metallic oxide and a solution of a metallic chloride, preferably the metal magnesium, but instead of 23 to 30 degrees Baumé, I use a weaker solution of the strength of 17 to 19 degrees Baumé. Having prepared this solution, I mix with it calcined, powdered magnesite until it is of the consistency of milk or thin cream. This is allowed to stand for an hour or two and is then divided into as many portions as there will be colors in the final product, and each portion receives a large proportion of mineral pigment, 1 to 3 or 1 to 4. More of the chloride solution is added so that it still maintains a perfect fluidity. After standing quiescent for three or four hours it is again thinned with the chloride and the article to be veneered is thoroughly moistened with the chloride solution. A coat of white, black or other desired color is now applied by spraying, dipping or pouring the liquid on the article and the excess drained off. In a few minutes this thin coat sets sufficiently and the colored preparations may be applied, using care and some skill in twirling, tipping and tapping to cause the colors to flow and spread and finally to cover the entire surface with a sharply defined graining. The total thickness of this veneer is 1/100th of an inch or more and it will not crack, scale nor become dim in time through efflorescence.

It will be noted that I use no aggregate or filler though it may be used if desired. I prefer to displace the filler ordinarily used with coloring matter, as the resulting product is much more brilliant and beautiful. My present invention is independent of the sources of the materials and of the particular processes whereby these materials are produced either individually or collectively, and I do not wish to be limited except as indicated in the appended claims.

I claim:

1. The method of coating surfaces which consists in preparing a solution of magnesite and magnesium chloride, then adding color pigments to separate portions of said mixture and adding chloride solution to maintain fluidity, then allowing initial setting to take place, then flowing a very thin coat of one color on the surface to be coated and allowing time to elapse to effect sufficient setting so as to prevent blending therewith of a subsequently applied color in liquid form, then applying other colors subsequently and distributing the colors to produce the desired effect.

2. The method of coating surfaces which consists in preparing a solution of magnesite and magnesium chloride, then adding differently colored pigments to separate portions of said fluid mixture and adding chloride solution to maintain fluidity then allowing initial setting to take place while maintaining fluidity, then flowing a thin coat of one color on the surface to be coated and allowing the said coat to initially set, then repeating the operation as to the other colors, said colors being distributed to produce the desired effect.

3. The method of veneering wood surfaces which consists in preparing a solution of magnesite and magnesium chloride, then adding colors to separate portions of said mixture while maintaining fluidity, then allowing partial setting to take place, then priming the wood surface to be treated, then subsequently flowing said colored portions on the surface to be treated, allowing sufficient time between the application of each color to permit initial setting to take place so as to avoid blending or mixing of the separate colors.

In testimony whereof I have affixed my signature.

GEORGE BENTLEY BERGEN, Sr.